US009441090B1

(12) United States Patent
Zhou

(10) Patent No.: US 9,441,090 B1
(45) Date of Patent: Sep. 13, 2016

(54) METHODS FOR CONTROLLING HARDNESS OF STYRENE-BUTADIENE BLOCK COPOLYMERS

(71) Applicant: Chevron Phillips Chemical Company LP, The Woodlands, TX (US)

(72) Inventor: Jinping Joe Zhou, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 14/645,841

(22) Filed: Mar. 12, 2015

(51) Int. Cl.
*C08K 5/15* (2006.01)
*C08K 5/1535* (2006.01)
*C08K 5/057* (2006.01)

(52) U.S. Cl.
CPC ............. *C08K 5/1535* (2013.01); *C08K 5/057* (2013.01)

(58) Field of Classification Search
CPC .............................. C08K 5/1535; C08K 5/057
USPC ....................................................... 524/113
See application file for complete search history.

(56) References Cited

U.S. PATENT DOCUMENTS

| | | | |
|---|---|---|---|
| 3,639,517 A | 2/1972 | Kitchen et al. | |
| 3,855,189 A | 12/1974 | Farrar et al. | |
| 3,865,776 A | 2/1975 | Gergen | |
| 4,048,254 A | 9/1977 | Hillier et al. | |
| 4,067,942 A | 1/1978 | Wilson | |
| 4,086,298 A | 4/1978 | Fahrbach et al. | |
| 4,088,813 A | 5/1978 | Willis | |
| 4,091,053 A | 5/1978 | Kitchen | |
| 4,386,190 A | 5/1983 | Bailey | |
| 4,403,074 A | 9/1983 | Moczygemba | |
| 4,405,754 A | 9/1983 | Moczygemba et al. | |
| 4,418,180 A | 11/1983 | Heinz et al. | |
| 4,440,815 A | 4/1984 | Zomorodi et al. | |
| 4,615,851 A | 10/1986 | Theodore et al. | |
| H179 H | 12/1986 | Klingensmith et al. | |
| 4,631,314 A | 12/1986 | Tung et al. | |
| 4,704,434 A | 11/1987 | Kitchen et al. | |
| 5,001,009 A | 3/1991 | Whitbourne | |
| 5,130,377 A | 7/1992 | Trepka et al. | |
| 5,198,495 A | 3/1993 | Fasulo et al. | |
| 5,227,419 A | 7/1993 | Moczygemba et al. | |
| 5,256,736 A | 10/1993 | Trepka et al. | |
| 5,274,035 A | 12/1993 | Chundury | |
| 5,290,875 A | 3/1994 | Moczygemba et al. | |
| 5,319,033 A | 6/1994 | Trepka et al. | |
| 5,331,048 A | 7/1994 | Hasselbring | |
| 5,369,174 A | 11/1994 | Hasselbring | |
| 5,393,838 A | 2/1995 | Moczygemba et al. | |
| 5,399,628 A | 3/1995 | Moczygemba et al. | |
| 5,436,298 A | 7/1995 | Moczygemba et al. | |
| 5,438,103 A | 8/1995 | DePorter et al. | |
| 5,545,690 A | 8/1996 | Trepka et al. | |
| 5,587,425 A | 12/1996 | Moczygemba et al. | |
| 5,705,569 A | 1/1998 | Moczygemba et al. | |
| 5,854,353 A | 12/1998 | Knoll et al. | |
| 5,885,530 A | 3/1999 | Babson et al. | |
| 5,910,546 A | 6/1999 | Trepka et al. | |
| 6,096,828 A | 8/2000 | DePorter et al. | |
| 6,107,411 A | 8/2000 | Toya et al. | |
| 6,197,889 B1 | 3/2001 | Knoll et al. | |
| 6,238,408 B1 | 5/2001 | Kawabata et al. | |
| 6,239,218 B1 | 5/2001 | Yonezawa et al. | |
| 6,265,484 B1 | 7/2001 | Trepka et al. | |
| 6,265,485 B1 * | 7/2001 | Trepka ................ C08F 297/044 525/271 |
| 6,420,486 B1 | 7/2002 | DePorter et al. | |
| 6,444,755 B1 | 9/2002 | DePorter et al. | |
| 6,521,712 B1 | 2/2003 | Knoll et al. | |
| 6,548,181 B2 | 4/2003 | Beusen | |
| 6,593,430 B1 | 7/2003 | Knoll et al. | |
| 6,835,778 B2 | 12/2004 | Swisher et al. | |
| 6,841,261 B2 | 1/2005 | Matsui et al. | |
| 6,846,535 B2 | 1/2005 | De Groot et al. | |
| 7,067,589 B2 | 6/2006 | Bening et al. | |
| 7,138,456 B2 | 11/2006 | Bening et al. | |
| 7,169,848 B2 | 1/2007 | Bening et al. | |
| 7,169,850 B2 | 1/2007 | Handlin, Jr. et al. | |
| 7,193,014 B2 | 3/2007 | Wilkey et al. | |
| 7,332,542 B2 | 2/2008 | Bening et al. | |
| 7,700,688 B2 | 4/2010 | Uzee et al. | |
| 7,737,216 B2 * | 6/2010 | Brown ................... C08F 297/04 525/271 |
| 7,776,965 B2 | 8/2010 | Wilkey et al. | |
| 8,058,346 B2 | 11/2011 | Wilkey et al. | |
| 8,236,894 B2 | 8/2012 | Brown et al. | |
| 8,415,429 B2 | 4/2013 | Brown et al. | |

(Continued)

FOREIGN PATENT DOCUMENTS

EP  0 512 530 A1  11/1992
EP  0 533 689 A1   8/1993

(Continued)

OTHER PUBLICATIONS

Hsieh, Henry L., et al., "Kinetics of Alkyllithium Initiated Polymerizations", Rubber Chemistry and Technology, (1970), 43(1), pp. 22-73.

Kennedy et al., "Synthesis and Characterisation of Styrene Butadiene Styrene Based Grafted Copolymers for Use in Potential Biomedical Application"; Biomedical Engineering, Trends in Materials Science, Department of Polymer Engineering, Athlone Institute of Technology, Ireland, www.intechopen.com; (2001) pp. 465-488.

(Continued)

*Primary Examiner* — Hui Chin
(74) *Attorney, Agent, or Firm* — Merchant & Gould P.C.

(57) ABSTRACT

Methods for controlling properties of a conjugated diene monovinylarene block copolymer using a modifier during polymerization are disclosed. For instance, the Shore A hardness of the copolymer can be decreased via the addition of the modifier compound.

20 Claims, 1 Drawing Sheet

(56) References Cited

U.S. PATENT DOCUMENTS

| | | |
|---|---|---|
| 8,933,171 B2 | 1/2015 | Pettey et al. |
| 9,040,628 B2 | 5/2015 | Brown et al. |
| 9,174,377 B2 | 11/2015 | Pettey et al. |
| 2002/0061982 A1 | 5/2002 | Donald et al. |
| 2003/0004267 A1 | 1/2003 | Swisher et al. |
| 2003/0144418 A1 | 7/2003 | Donald et al. |
| 2004/0115381 A1 | 6/2004 | Harris et al. |
| 2006/0211818 A1 | 9/2006 | Kurimura et al. |
| 2006/0235118 A1 | 10/2006 | Selby et al. |
| 2006/0235188 A1 | 10/2006 | Weinhold et al. |
| 2007/0027257 A1 | 2/2007 | Kobashi et al. |
| 2007/0043168 A1 | 2/2007 | Montiel-Ortiz et al. |
| 2007/0093601 A1 | 4/2007 | Watanabe et al. |
| 2007/0173605 A1 | 7/2007 | Brown et al. |
| 2008/0215016 A1 | 9/2008 | Igarashi et al. |
| 2011/0098401 A1 | 4/2011 | Müller et al. |
| 2011/0251596 A1 | 10/2011 | Kim et al. |
| 2012/0270979 A1 | 10/2012 | Hsu et al. |

FOREIGN PATENT DOCUMENTS

| | | |
|---|---|---|
| EP | 0 603 852 A1 | 6/1994 |
| EP | 0 646 607 | 4/1995 |
| EP | 0 654 488 A1 | 5/1995 |
| EP | 0 761 704 A1 | 3/1997 |
| EP | 1 123 715 A2 | 8/2001 |
| EP | 1 605 002 A1 | 12/2005 |
| GB | 1 491 741 | 11/1977 |
| JP | 2006/083233 | 3/2006 |
| WO | WO 01/25303 A1 | 4/2001 |
| WO | WO 03/018685 A2 | 3/2006 |

OTHER PUBLICATIONS

Kraus, Gerald, et al., "Morphology and Dynamic Viscoelastic behavior of blends of Styrene-Butadiene Block Copolymers", Adv. Chem. Ser., (1979), 176, pp. 277-292.

Knoll, Konrad, et al. "Styrolux and styroflex. From Transparent High Impact Polystyrene to New Thermoplastic Elastomers. Syntheses, Applications, and Blends with Other Styrene-Based Polymers", Macromolecular Symposia (1998), 132, pp. 231-243.

CEN European Standard, "Test methods for kinking of single lumen catheters and medical tubing," EN 13868 (2002), 13 pages.

U.S. Appl. No. 14/645,658, filed Mar. 12, 2015, entitled "Styrene-Butadiene Block Copolymers for Tubing Applications."

U.S. Appl. No. 14/844,039, filed Sep. 3, 2015, entitled "Blends of Styrene-Butadiene Block Copolymer with Styrenic Thermoplastic Elastomers for Tubing Applications."

U.S. Appl. No. 14/857,875, filed Sep. 18, 2015, entitled "Styrene-Butadiene Block Copolymers With a Terminal Butadiene Block for Tubing Applications."

International Search Report and the Written Opinion of the International Searching Authority in PCT/US2016/021948 dated Jun. 9, 2016, 8 pages.

\* cited by examiner

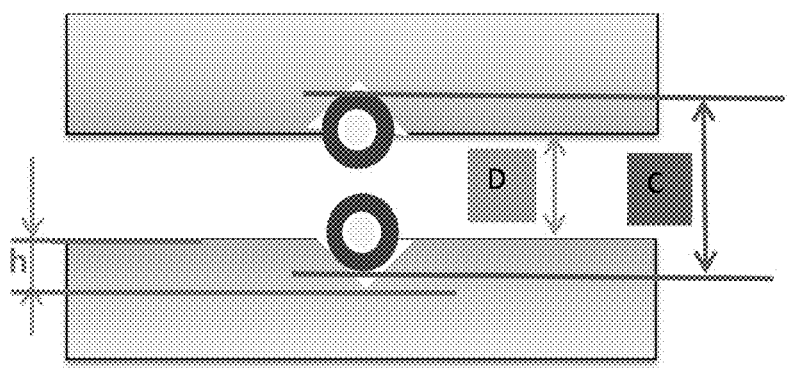

METHODS FOR CONTROLLING HARDNESS OF STYRENE-BUTADIENE BLOCK COPOLYMERS

BACKGROUND OF THE INVENTION

There are various methods that can be employed to adjust or control the polymer properties and the performance characteristics of a conjugated diene monovinylarene block copolymer. For instance, the relative amounts of the conjugated diene monomer and the monovinylarene monomer used during polymerization can be changed to vary the polymer properties and the performance characteristics of the block copolymer that is produced. However, additional methods of adjusting or controlling certain polymer properties and performance characteristics (e.g., Shore hardness) are needed which do not require changes in the polymerization system or the relative amounts of the conjugated diene monomer and the monovinylarene monomer. Accordingly, it is to these ends that the present disclosure is directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Various processes and methods related to the control of conjugated diene monovinylarene block copolymerizations are disclosed herein. In one embodiment, a method for controlling a conjugated diene monovinylarene copolymerization reaction is provided herein, and in this embodiment, the method can comprise:

(i) contacting a monovinylarene monomer, a conjugated diene monomer, and an initiator in a predetermined sequence under polymerization conditions in a polymerization reactor system, and thereafter coupling and/or terminating to form a conjugated diene monovinylarene block copolymer;

wherein the predetermined sequence comprises a dual charge of the monovinylarene monomer and the conjugated diene monomer; and (ii) introducing a modifier into the polymerization reactor system before the dual charge to control hardness (e.g., Shore A hardness) of the block copolymer.

A process for producing a conjugated diene monovinylarene block copolymer with a target hardness (e.g., a target Shore A hardness) is provided herein, and consistent with embodiments of this invention, the process can comprise:

(a) contacting a monovinylarene monomer, a conjugated diene monomer, and an initiator in a predetermined sequence under polymerization conditions in a polymerization reactor system, and thereafter coupling and/or terminating to form the copolymer;

wherein the predetermined sequence comprises a dual charge of the monovinylarene monomer and the conjugated diene monomer; and (b) controlling an amount of a modifier introduced into the polymerization reactor system to produce the copolymer with the target hardness.

In these methods and processes, the hardness (e.g., Shore A hardness, Shore D hardness, etc.) of the conjugated diene monovinylarene block copolymer can decrease due to the addition of the modifier to the polymerization reactor system.

Both the foregoing summary and the following detailed description provide examples and are explanatory only. Accordingly, the foregoing summary and the following detailed description should not be considered to be restrictive. Further, features or variations may be provided in addition to those set forth herein. For example, certain embodiments may be directed to various feature combinations and sub-combinations described in the detailed description.

BRIEF DESCRIPTION OF THE FIGURE

FIG. 1 presents a schematic of the apparatus used to determine the kink resistance and re-kink resistance of tubing, as described herein.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

While compositions and methods are described in terms of "comprising" various components or steps, the compositions and methods can also "consist essentially of" or "consist of" the various components or steps, unless stated otherwise.

The terms "a," "an," and "the" are intended to include plural alternatives, e.g., at least one. For instance, the disclosure of "a modifier," "a dual charge," etc., is meant to encompass one, or mixtures or combinations of more than one modifier, dual charge, etc., unless otherwise specified.

The term "polymer" is used herein generically to include homopolymers, copolymers, terpolymers, and so forth, while a "copolymer" is used generically to include copolymers, terpolymers, and so forth. Thus, "polymer" and "copolymer" encompass polymeric materials derived from any monomer and comonomer (one or more than one) disclosed herein. As would be readily recognized by those of skill in the art, block copolymers in accordance with this invention contain a mixture of polymer chains of various sizes (e.g., a distribution of molecular weights), and the respective polymer chains can vary compositionally (e.g., relative amounts of conjugated diene monomer versus monovinylarene monomer).

As used herein, a "conjugated diene monomer" refers to an organic compound containing conjugated carbon-carbon double bonds and often a total of 4 to 12 carbon atoms, such as 4 to 8 carbon atoms. Exemplary conjugated diene monomers can include, but are not limited to, 1,3-butadiene, 2-methyl-1,3-butadiene (isoprene), 2-ethyl-1,3-butadiene, 2,3-dimethyl-1,3-butadiene, 1,3-pentadiene, 3-butyl-1,3-octadiene, and the like, as well as mixtures thereof. For example, in some embodiments disclosed herein, the conjugated diene monomer can be a butadiene, while in other embodiments, the conjugated diene monomer can be 1,3-butadiene.

A unit of a polymer, wherein the unit is derived from polymerization of a conjugated diene monomer, can be referred to as a "conjugated diene unit."

As used herein, a "monovinylarene monomer" refers to an organic compound containing a single carbon-carbon double bond, at least one aromatic moiety, and often a total of 8 to 18 carbon atoms, such as 8 to 12 carbon atoms. Exemplary monovinylarene monomers can include, but are not limited to, styrene, alpha-methylstyrene, 2-methylstyrene, 3-methylstyrene, 4-methylstyrene, 2-ethylstyrene, 3-ethylstyrene, 4-ethylstyrene, 4-n-propylstyrene, 4-t-butylstyrene, 2,4-dimethylstyrene, 4-cyclohexylstyrene, 4-decylstyrene, 2-ethyl-4-benzylstyrene, 4-(4-phenyl-n-butyl)styrene, 1-vinylnaphthalene, 2-vinylnaphthalene, diphenylethylene, and the like, as well as mixtures thereof. For example, in some embodiments disclosed herein, the monovinylarene monomer can be styrene.

A unit of a polymer, wherein the unit is derived from polymerization of a monovinylarene monomer, can be referred to as a "monovinylarene unit."

A "conjugated diene monovinylarene block copolymer" is a polymer comprising polymer chains containing monovinylarene monomer units and conjugated diene monomer units. For example, in some embodiments disclosed herein, the conjugated diene monovinylarene block copolymer can be a styrene butadiene copolymer. The conjugated diene monovinylarene block copolymer comprises more than one block, wherein each block comprises monovinylarene monomer units and/or conjugated diene monomer units. If the block comprises only one type of monomer unit, it can be termed a "monoblock." If the block comprises both, it can be termed a "mixed" block. Exemplary mixed blocks can include, but are not limited to, random blocks, tapered blocks, stepwise blocks, or any other type of mixed block.

A mixed block is "tapered" when both (a) the mole fraction of conjugated diene units in a first section of the block is higher than the mole fraction of conjugated diene units in a second section of the block, wherein the second section of the block is closer to a given end of the block, and (b) condition (a) is true for substantially all sections of the block. Depending on the size of the sections being considered, condition (a) may not be true for all sections, but if so, will be not true at no more than about the level expected by chance.

A mixed block is "random" when the mole fractions of conjugated diene units and monovinylarene units in a section of the block are substantially the same as the mole fractions of conjugated diene units and monovinylarene units in the entire block. This does not preclude the possibility of sections of the block having regularity (i.e., appearing non-random), but such regular sections will typically be present at no more than about the level expected by chance.

The terms "contact product," "contacting," and the like, are used herein to describe compositions wherein the components are contacted together in any order, in any manner, and for any length of time. For example, the components can be contacted by blending or mixing. Further, unless otherwise specified, the contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can, and often does, include reaction products, it is not required for the respective components to react with one another. Likewise, "contacting" two or more components can result in a reaction product or a reaction mixture. Consequently, depending upon the circumstances, a "contact product" can be a mixture, a reaction mixture, or a reaction product.

Although any methods and materials similar or equivalent to those described herein can be used in the practice or testing of the invention, the typical methods and materials are herein described.

All publications and patents mentioned herein are incorporated herein, in their entirety, by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

Applicants disclose several types of ranges in the present invention. When Applicants disclose or claim a range of any type, Applicants' intent is to disclose or claim individually each possible number that such a range could reasonably encompass, including end points of the range as well as any sub-ranges and combinations of sub-ranges encompassed therein. A representative example follows for the Shore A hardness of a block copolymer in embodiments of this invention. For example, by a disclosure that the Shore A hardness is in a range from about 50 to about 90, Applicants intend to recite that the Shore A hardness can be any Shore A hardness in the range and can be equal to, for instance, about 50, about 55, about 60, about 65, about 70, about 75, about 80, about 85, or about 90. Additionally, the Shore A hardness can be within any range from about 50 to about 90 (for example, the Shore A hardness can be in a range from about 60 to about 80), and this also includes any combination of ranges between about 50 and about 90. Likewise, all other ranges disclosed herein should be interpreted in a manner similar to this representative example.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

DETAILED DESCRIPTION OF THE INVENTION

Disclosed herein are methods and processes directed to controlling conjugated diene monovinylarene copolymerization reactions in a polymerization reactor system via the addition of a modifier. Unexpectedly, it was found that in these methods and processes, the addition of (and the amount of) the modifier added to the reactor system can be used to adjust or control the hardness of the conjugated diene monovinylarene block copolymer.

For example, in one embodiment of this invention, a method for controlling a conjugated diene monovinylarene copolymerization reaction is disclosed. In this embodiment, the method can comprise:

(i) contacting a monovinylarene monomer, a conjugated diene monomer, and an initiator in a predetermined sequence under polymerization conditions in a polymerization reactor system, and thereafter coupling and/or terminating to form a conjugated diene monovinylarene block copolymer;

wherein the predetermined sequence comprises a dual charge of the monovinylarene monomer and the conjugated diene monomer; and (ii) introducing a modifier into the polymerization reactor system before the dual charge to control hardness of the copolymer.

Thus, the addition of the modifier (e.g., increasing the amount of the modifier compound) can decrease the hardness of the conjugated diene monovinylarene block copolymer.

In another embodiment of this invention, a process for producing a conjugated diene monovinylarene block copolymer with a target hardness is disclosed. In this embodiment, the process can comprise:

(a) contacting a monovinylarene monomer, a conjugated diene monomer, and an initiator in a predetermined sequence under polymerization conditions in a polymerization reactor system, and thereafter coupling and/or terminating to form the copolymer;

wherein the predetermined sequence comprises a dual charge of the monovinylarene monomer and the conjugated diene monomer; and (b) controlling an amount of a modifier introduced into the polymerization reactor system to produce the copolymer with the target hardness.

Thus, the addition of the modifier (e.g., increasing the amount of the modifier to decrease the hardness) can be used to produce a conjugated diene monovinylarene block copolymer with a specific hardness. In the methods and processes of this invention, the hardness can be determined using any suitable hardness measurement, including but not limited to, the Shore A hardness, the Shore D hardness, and so forth.

In these methods and processes, the modifier can be introduced (e.g., added, injected, etc.) into the polymerization reactor system by any suitable means, for instance, alone, or with a carrier (e.g., a carrier gas, a carrier liquid, etc.). The modifier can be introduced into the polymerization reactor system at any suitable location within the reactor system. In one embodiment, the modifier can be added directly into a polymerization reactor within the polymerization reactor system, while in another embodiment, the modifier can be introduced into the polymerization reaction system at a feed or inlet location other than directly into a polymerization reactor, for example, in a recycle stream. In some embodiments, the modifier can be added to the reactor by itself, while in other embodiments, the modifier can be added to the reactor with a carrier or solvent, and non-limiting examples of suitable carriers or solvents can include hydrocarbons such as hexane, heptane, cyclohexane, and the like, as well as combinations thereof. In certain embodiments, the modifier can be added to the reactor with the conjugated diene monomer and/or with the monovinylarene monomer. In particular embodiments contemplated herein, the modifier can be added to the polymerization reactor system with the initiator. Other appropriate feed options for the addition of the modifier into a polymerization reactor system are readily apparent from this disclosure.

Generally, the features of the methods and processes disclosed herein (e.g., the conjugated diene monomer, the monovinylarene monomer, the initiator, the predetermined sequence, the polymerization conditions, the polymerization reactor system, the modifier (one or more), the amount of the modifier, the dual charge (one or more), the hardness, among others) are independently described herein, and these features can be combined in any combination to further describe the disclosed processes and methods.

In the production of conjugated diene monovinylarene block copolymers, the conjugated diene monomer, the monovinylarene monomer, and the initiator can be contacted under polymerization conditions in a polymerization reactor system in a predetermined sequence in order to produce the desired conjugated diene monovinylarene block copolymer. As would be recognized by one of skill in the art, additional components can be added into the polymerization reactor system in addition to these recited components, and such unrecited components are encompassed herein. For instance, in the operation of a polymerization reactor system—depending, of course, on the polymerization reactor type, the desired block copolymer, etc., among other factors—solvents/diluents, coupling agents, terminating agents, etc., also can be added or introduced into the polymerization reactor system.

In accordance with this invention, any suitable predetermined sequence used to produce a conjugated diene monovinylarene block copolymer can be employed. For instance, and not to be limited thereto, encompassed herein are the following predetermined charge sequences, each have at least one "(S/B)" dual charge:

(A) i-S-S-i-(S/B)-X;
(B) i-S-i-(S/B)-i-S-B-X;
(C) i-S-i-S-(S/B)-i-S-B-X;
(D) i-S-i-S-(S/B)-(S/B)-X;
(E) i-S-i-S-(S/B)-(S/B)-B-X;
(F) i-S-i-S-(S/B)-(S/B)-(S/B)-X;
(G) i-S-i-S-(S/B)-(S/B)-(S/B)-B-X;
(H) i-S-i-S-(S/B)-(S/B)-(S/B)-(S/B)-X; and
(I) i-S-i-S-(S/B)-(S/B)-(S/B)-(S/B)-B-X.

In formulas (A) to (I), S is a monovinylarene charge (to produce a monoblock of the monovinylarene, such as styrene), B is a conjugated diene charge (to produce a monoblock of the conjugated diene, such as butadiene), and (S/B) is a dual charge of the monovinylarene and conjugated diene (to produce a mixed block of the conjugated diene and monovinylarene). Each i is an initiator, the presence of which can start a new polymer chain. X in these formulas represents a coupling agent or a terminating agent.

An illustrative process for producing a block copolymer using predetermined charge sequence (F), therefore, can comprise contacting:

(i) a first initiator charge and a first charge of the monovinylarene monomer and allowing polymerization to occur until minimal free monomer is present; thereafter contacting all products of step (i) with (ii) a second initiator charge and a second charge of the monovinylarene monomer and allowing polymerization to occur until minimal free monomer is present; thereafter contacting all products of step (ii) with (iii) a first mixture of the monovinylarene monomer and the conjugated diene monomer and allowing polymerization to occur until minimal free monomer is present; thereafter contacting all products of step (iii) with (iv) a second mixture of the monovinylarene monomer and the conjugated diene monomer and allowing polymerization to occur until minimal free monomer is present; thereafter contacting all products of step (iv) with (v) a third mixture of the monovinylarene monomer and the conjugated diene monomer and allowing polymerization to occur until minimal free monomer is present; thereafter contacting all products of step (v) with (vi) a coupling agent.

Consistent with embodiments disclosed herein, the addition of the modifier can be used to control, adjust, fine-tune, etc., the hardness (e.g., Shore A hardness, Shore D hardness, etc.) of a particular grade of block copolymer without having to vary the relative amounts of the monovinylarene monomer and the conjugated diene monomer, the polymerization conditions, and so forth. In some embodiments, the polymerization conditions can be held substantially constant (e.g., within +/−5%), for example, for the production of a particular grade of block copolymer. Representative polymerization conditions include absolute temperature, gauge pressure, residence time, and the like. As above, in such circumstances, the addition of the modifier can be used to control, adjust, fine-tune, etc., the hardness properties of that particular polymer resin.

Optionally, if additional control parameters for the copolymerization process are desired other than the use of a modifier, the methods and processes disclosed herein can further comprise a step of adjusting at least one polymerization condition (e.g., temperature, pressure, residence time, etc.).

Unexpectedly, in these methods and processes, the hardness (e.g., Shore A hardness, Shore D hardness, etc.) of the block copolymer can decrease as the amount of the modifier added to the polymerization reactor system is increased. Also unexpectedly, the pellet blocking force of the block copolymer can increase as the amount of the modifier added to the polymerization reactor system is increased.

The modifier (one or more) can be introduced into the polymerization reactor system (e.g., into a polymerization reactor) alone, with a carrier, etc., and at any suitable stage in the block copolymerization process. In one embodiment, for instance, the modifier can be added before the first initiator charge; alternatively, concurrently with the first initiator charge; or alternatively, after the first initiator charge, but before the first monomer charge. In another embodiment, the modifier can be added before the first dual charge of the monovinylarene monomer and the conjugated diene monomer; alternatively, concurrently with the charge of either the monovinylarene monomer, or the conjugated diene monomer, or both; or alternatively, shortly thereafter the dual charge of the monovinylarene monomer and the conjugated diene monomer. In yet another embodiment, and in circumstances where the predetermined charge sequence contains two or more dual charges of the monovinylarene monomer and the conjugated diene monomer, the modifier can be added prior to, concurrently with, or shortly thereafter the first dual charge; alternatively, the modifier can be added prior to, concurrently with, or shortly thereafter each dual charge; or alternatively, the modifier can be added prior to, concurrently with, or shortly thereafter at least one of the dual charges, but not added for all of the dual charges. In addition to these periodic additions of the modifier, Applicants also contemplate continuous addition of the modifier throughout one or more stages of the process, for instance, continuous addition during a dual charge of the monovinylarene monomer and the conjugated diene monomer and the subsequent polymerization of the mixed block, prior to a subsequent charge (or coupling, or terminating). Other appropriate stages (e.g., any time before any dual charge) for the addition of the modifier during the block copolymerization process are readily apparent from this disclosure.

The amount of the modifier added to the reactor system is not particularly limited, so long as the amount of the modifier added to the reactor system is sufficient to impact at least one of the hardness and the pellet blocking force of the block copolymer, as described herein. While not being limited thereto, the amount of the modifier added typically can be in a molar ratio range, based on the total moles of modifier to the total moles of monomer, from about 1:100,000 to about 1:50. This molar ratio is based on the respective total amounts of modifier and total amounts of monomer (monovinylarene monomer and conjugated diene monomer) fed into the reactor system (e.g., into a polymerization reactor). Thus, if the modifier is added twice during the process, the molar ratio is based on the total modifier addition. In some embodiments, this molar ratio (total moles of modifier to total moles of monomer components) can be in a range from about 1:250 to about 1:10,000, from about 1:500 to about 1:5,000, from about 1:1,000 to about 1:5,000, from about 1:1,500 to about 1:5,000, or from about to about 1:1,500 to about 1:3,000.

The methods and processes disclosed herein can be used to produce block copolymers having various melt flow and molecular weight properties. For example, copolymers having a melt flow rate (MFR) ranging from about 1 to about 30 g/10 min (or from about 3 to about 20 g/10 min) and a number-average molecular weight (Mn) ranging from about 5,000 to about 2,000,000 g/mol (or from about 10,000 to about 500,000 g/mol) are encompassed herein. For the production of a particular grade of a block copolymer, with certain desired properties (e.g., monovinylarene content, MFR, Mn, etc.), a target hardness (e.g., target Shore A hardness) of the block copolymer can be established. Thus, when the particular block copolymer grade is produced, the amount of the modifier introduced into the polymerization reactor system can be controlled to produce the block copolymer with the target hardness (e.g., target Shore A hardness). Accordingly, in some embodiments, the processes and methods provided herein optionally can further comprise the steps of determining (or measuring) the hardness (e.g., Shore A hardness) of the block copolymer, and then adjusting the amount of the modifier introduced into the polymerization reactor system based on the difference between the measured hardness (e.g., Shore A hardness) and the target hardness (e.g., Shore A hardness). As a representative example using the Shore A hardness, if the measured Shore A hardness is higher than that of the target Shore A hardness for the production of a particular grade of block copolymer, then the modifier can be added at an amount appropriate to make the measured Shore A hardness equivalent to that of the target Shore A hardness. For instance, the addition amount of the modifier can be increased to reduce the Shore A hardness of the copolymer.

Likewise, for the production of a particular grade of a block copolymer, with certain desired properties (e.g., monovinylarene content, MFR, Mn, etc.), a target pellet blocking force of the block copolymer can be established. Thus, when the particular block copolymer grade is produced, the amount of the modifier introduced into the polymerization reactor system can be controlled to produce the block copolymer with the target pellet blocking force. Accordingly, in some embodiments, the processes and methods provided herein optionally can further comprise the steps of determining (or measuring) the pellet blocking force of the block copolymer, and then adjusting the amount of the modifier introduced into the polymerization reactor system based on the difference between the measured pellet blocking force and the target pellet blocking force. As a representative example, if the measured pellet blocking force is higher than that of the target pellet blocking force for the production of a particular grade of block copolymer, then the modifier can be added at an amount appropriate to make the measured pellet blocking force equivalent to that of the target pellet blocking force. For instance, the addition amount of the modifier can be decreased to reduce the pellet blocking force of the copolymer.

Consistent with embodiments disclosed herein, optionally and as-needed, various polymerization conditions or process variables can be adjusted or controlled during the operation of a polymerization reactor system, and such conditions or variables can include, but are not limited to, reaction temperature, reactor pressure, residence time, initiator addition and amount, monovinylarene monomer addition and amount, conjugated diene monomer addition and amount, and the like. In each of the methods and process disclosed herein, the hardness of the block copolymer can decrease, the pellet blocking force of the block copolymer can increase, or the hardness can decrease and the pellet blocking force can increase, as the amount of the modifier added to the polymerization reactor system increases.

As described herein, the processes for producing block copolymers can employ an initiator. Suitable initiators are well known to those of skill in the art, such as alkali metal hydrocarbons, a representative example of which is n-butyl lithium. Each initiator can be either the same or different; for instance, a second initiator charge can be the same as or different from a first charge, in terms of the initiator used and/or the amount of initiator. The amount of initiator employed can depend on many factors, but typically can be in the range from about 0.01 phm to about 1 phm, or from about 0.01 phm to about 0.5 phm, or from about 0.01 phm to about 0.2 phm (phm is parts by weight per hundred parts of total monomer in the copolymer). Independently, initiator charges can be used prior to or concurrently with a monovinylarene charge (or charges), prior to or concurrently with a conjugated diene charge (or charges), or prior to or concurrently with a dual charge (or charges).

The copolymerization reaction can be conducted in any suitable hydrocarbon diluent at any suitable polymerization temperature, such as in the range of from about −100° C. to about 150° C., of from about 10° C. to about 125° C., and at a pressure sufficient to maintain the reaction mixture substantially in the liquid phase (e.g., from about 14.8 to about 180 psig, equivalently, about 0.1 to about 1.2 MPa). Illustrative hydrocarbon diluents can include, but are not limited to, pentane, hexane, octane, cyclopentane, cyclohexane, and the like, as well as mixtures or combinations thereof. Often, the polymerization process can be conducted in the substantial absence of oxygen and water, and more often, under an inert gas atmosphere. Moreover, as noted herein, each charge of monomer or mixture of monomers can be polymerized to substantial completion, before a subsequent charge of monomer or mixture of monomers (with or without initiator) is commenced.

After polymerization is complete, a coupling agent can be added. Suitable coupling agents can include di- or multivinylarene compounds, di- or multiepoxides, di- or multiisocyanates, di- or multiimines, di- or multialdehydes, di- or multiketones, alkoxytin compounds, alkoxysilicon compounds, di- or multihalides (e.g., silicon halides, tin halides, halosilanes, halohydrocarbons, and combinations thereof, such as halomethyl silicon tri-halides), mono-, di-, or multianhydrides, di- or multiesters (e.g., esters of monoalcohols with polycarboxylic acids, esters of monohydric alcohols with dicarboxylic acids, esters of monobasic acids with polyalcohols such as glycerol), and the like, and as well as any mixture or combination thereof. Other suitable multifunctional coupling agents can include epoxidized natural source oils, such as epoxidized soybean oil, epoxidized linseed oil, and the like, as well as combinations thereof. The amount of the coupling agent employed can depend on many factors, but typically can be in the range from about 0.1 phm to about 20 phm, from about 0.1 phm to about 5 phm, or from about 0.1 phm to about 2 phm.

After coupling, or instead of coupling, the termination of the polymerization reaction can be accomplished using any suitable deactivating agent, illustrative examples of which can include water, carbon dioxide, an alcohol, a phenol, a mono- or di-carboxylic acid, and the like, and combinations thereof Modifiers Modifiers suitable for use herein can include, for example, polar compounds such as ethers, amines, metal phenolates, metal sulfonates, metal alkoxides, bidentates, and tridentates, as well as combinations thereof. In some embodiments, the modifier can comprise a potassium alkoxide, a sodium alkoxide, a metal phenolate, a tertiary amine, an ether (cyclic or acyclic), a thioether, and the like, as well as any mixture or combination thereof. In other embodiments, the modifier can comprise dimethyl ether, diethyl ether, ethyl methyl ether, ethyl propyl ether, di-n-propyl ether, di-n-octyl ether, anisole, dioxane, 1,2-dimethoxyethane, 1,2-diethoxypropane, dibenzyl ether, diphenyl ether, 1,2-dimethoxybenzene, tetrahydrofuran (THF), bis(2-methoxyethyl) ether (diglyme), potassium tert-amylate (KTA), sodium dimethyloctylate (NaODMO), dimethyl sulfide, diethyl sulfide, di-n-propyl sulfide, di-n-butyl sulfide, methyl ethyl sulfide, dimethylethylamine, tri-n-ethylamine, tri-n-propylamine, tri-n-butylamine, trimethylanine, trimethylamine (TEA), tetramethylethylenediamine (TMEDA), tetraethylethylenediamine, N,N-di-methylaniline, N-methyl-N-ethylaniline, N-methylmorpholine, sodium dodecylbenzene sulfonate (NaDBS), and the like, as well as mixtures or combinations thereof In one embodiment of this invention, the modifier can comprise any polar compound and/or melt salt. In another embodiment, the modifier can comprise an amine, an ether, an alkoxide, or a combination thereof; alternatively, an amine; alternatively, an ether; or alternatively, an alkoxide. In yet another embodiment, the modifier can comprise THF. In still another embodiment, the modifier can comprise KTA. Other suitable modifiers are readily apparent from this disclosure.

Conjugated Diene Monovinylarene Block Copolymers

Any suitable conjugated diene monovinylarene block copolymer (using any suitable predetermined charge sequence) can be produced using the methods and processes described herein, provided that the conjugated diene monovinylarene block copolymer contains a mixed block (one or more), e.g., produced from a dual charge (one or more) of the conjugated diene monomer and the monovinylarene monomer. Various monovinylarene monomers and conjugated diene monomers can be used to form the conjugated diene monovinylarene block copolymers. As described herein, the monovinylarene monomer often can contain from 8 to 18 carbon atoms (e.g., the monovinylarene monomer can be styrene or, alternatively, the monovinylarene monomer can be methylstyrene), and the conjugated diene monomer can contain from 4 to 12 carbon atoms (e.g., the conjugated diene can be a butadiene or, alternatively, the conjugated diene can be 1,3-butadiene). Accordingly, in a particular embodiment disclosed herein, the conjugated diene monovinylarene block copolymer can comprise a styrene butadiene block copolymer (SBC).

The relative amount of conjugated diene and monovinylarene in the block copolymer is not limited to any particular range, however, the conjugated diene monovinylarene block copolymer typically can have from about 15 to about 95 wt. %, or from about 25 to about 95 wt. %, monovinylarene monomer content, based on the total weight of the (final) block copolymer. In some embodiments, the conjugated diene can be the major component, and the conjugated diene monovinylarene block copolymer can have from about 20 to about 50 wt. % monovinylarene monomer content, from about 25 to about 50 wt. % monovinylarene monomer content, from about 20 to about 45 wt. % monovinylarene monomer content, or from about 25 to about 45 wt. % monovinylarene monomer content, based on the total weight of the block copolymer. In other embodiments, the monovinylarene can be the major component, and the conjugated diene monovinylarene block copolymer can have from about 50 to about 95 wt. % monovinylarene monomer content, from about 50 to about 80 wt. % monovinylarene monomer content, from about 55 to about 85 wt. % monovinylarene monomer content, or from about 65 to about 80 wt. % monovinylarene monomer content, based on the total weight of the block copolymer.

In an embodiment of this invention, the conjugated diene monovinylarene block copolymer can be an uncoupled conjugated diene monovinylarene block copolymer. Uncoupled block copolymers often can be referred to in the art as terminated or quenched copolymers. In further embodiments, the conjugated diene monovinylarene block copolymer can be an uncoupled unimodal conjugated diene monovinylarene block copolymer, or alternatively, the block copolymer can be an uncoupled multimodal conjugated diene monovinylarene block copolymer.

In yet another embodiment of this invention, the conjugated diene monovinylarene block copolymer can be a coupled conjugated diene monovinylarene block copolymer. Further, the coupled conjugated diene monovinylarene block copolymer can be a coupled unimodal conjugated diene monovinylarene block copolymer or a coupled multimodal conjugated diene monovinylarene block copolymer. In some embodiments, the block copolymer can be produced by coupling at least two different living polymer chains having been produced by at least two separate charges of initiator. Coupling can be accomplished by any method known to those of skill in the art, such as described herein.

In an embodiment, the conjugated diene monovinylarene block copolymer can comprise at least 2 blocks, at least 3 blocks, at least 4 blocks, or at least 5 blocks. For example, the conjugated diene monovinylarene block copolymer can comprise from 2 to 10 blocks, from 3 to 7 blocks, from 4 to 6 blocks, or from 3 to 5 blocks, and so forth. Any blocks can be selected independently from any combination of conjugated diene monoblocks, monovinylarene monoblocks, or conjugated diene monovinylarene mixed blocks. Any mixed block, for instance, independently can be a tapered mixed block or a random mixed block. In accordance with this disclosure, repeated blocks with an intervening charge of initiator are not considered to be one block. Likewise, repeated mixed blocks also are not considered to be one block.

In certain embodiments, each mixed conjugated diene monovinylarene block, independently, can contain conjugated diene units and monovinylarene units with a weight ratio of conjugated diene units to monovinylarene units in a range from about 0.05 to about 0.33, from about 0.06 to about 0.28, or from about 0.08 to about 0.26, although not being limited thereto.

Optionally, the conjugated diene monovinylarene block copolymer can be hydrogenated, although this is not a requirement. In one embodiment, for instance, the block copolymer can be partially hydrogenated, while in another embodiment, the block copolymer can be fully hydrogenated.

The block copolymers can be produced using any suitable polymerization process using various types of polymerization reactors, polymerization reactor systems, and polymerization reaction conditions, as recognized by those of skill in the art. While not being limited thereto, general information on processes for producing conjugated diene monovinylarene block copolymers that can be employed in various embodiments of this invention are described in U.S. Pat. Nos. 3,639,517, 6,096,828, 6,420,486, 6,444,755, 6,835,778, 7,037,980, 7,193,014, 7,875,678, 8,415,429, and 8,933,171, the disclosures of which are incorporated herein by reference in their entirety; and U.S. Patent Publication Nos. 2006/0089457 and 2007/0173605, the disclosures of which are incorporated herein by reference in their entirety.

In some embodiments of this invention, conjugated diene monovinylarene block copolymers comprising from about 35 phm to about 80 phm monovinylarene monomer can be produced, and these block copolymers can comprise polymer chains containing a block structure having formula (1):

$$S_1\text{-}(S/B)_1 \tag{1}$$

In formula (1), $S_1$ can be a monoblock of the monovinylarene monomer, wherein $S_1$ can be from about 10 phm to about 45 phm of the copolymer, and $(S/B)_1$ can be a mixed block of the conjugated diene monomer and the monovinylarene monomer, wherein the monovinylarene monomer content can be from about 20 wt. % to about 80 wt. %, based on the total weight of $(S/B)_1$. The abbreviation "phm" means parts by weight per hundred parts of total monomer in the copolymer. Optionally, these block copolymers also can have a kink resistance of tubing produced from the copolymer in any range disclosed herein, e.g., less than or equal to about 40 mm, less than or equal to about 35 mm, in a range from about 10 to about 40 mm, in a range from about 10 mm to about 25 mm, etc., as determined using the test method described herein.

Consistent with certain embodiments of this invention, the monovinylarene monomer content of the conjugated diene monovinylarene block copolymer having formula (1) often can be in a range from about 35 phm to about 80 phm, from about 40 phm to about 80 phm, or from about 40 phm to about 75 phm. In further embodiments, the monovinylarene monomer content, based on the conjugated diene monovinylarene block copolymer, can be in a range from about 52 phm to about 75 phm, from about 55 phm to about 75 phm, or from about 55 phm to about 70 phm.

In an embodiment, $S_1$ (the monoblock of the monovinylarene monomer) can be in a range from about 10 phm to about 45 phm, from about 18 phm to about 42 phm, or from about 20 phm to about 40 phm. In another embodiment, $S_1$, based on the conjugated diene monovinylarene block copolymer, can be in a range from about 20 phm to about 35 phm, from about 25 phm to about 40 phm, or from about 25 phm to about 35 phm.

In an embodiment, the monovinylarene monomer content based on the weight of the mixed block of $(S/B)_1$ often can be in a range from about 20 wt. % to about 80 wt. %, from about 25 wt. % to about 75 wt. %, or from about 20 wt. % to about 70 wt. %. In another embodiment, the monovinylarene monomer, based on the weight of $(S/B)_1$, can be in a range from about 20 wt. % to about 65 wt. %, from about 40 wt. % to about 65 wt. %, from about 20 wt. % to about 55 wt. %, or from about 40 wt. % to about 60 wt. %.

An illustrative and non-limiting example of a conjugated diene monovinylarene block copolymer of the present invention can have formula (1) and the following characteristics: a monovinylarene monomer content in a range from about 52 phm to about 75 phm (or from about 55 phm to about 70 phm), $S_1$ in a range from about 20 phm to about 38 phm (or from about 25 phm to about 36 phm), and a monovinylarene monomer content of $(S/B)_1$ in a range from about 25 wt. % to about 75 wt. % (or from about 35 wt. % to about 65 wt. %).

As noted herein, $S_1$ in formula (1) can be a monoblock of the monovinylarene monomer, wherein $S_1$ can be from about 10 phm to about 45 phm of the copolymer. In these and other embodiments, $S_1$ can be a single monoblock of the monovinylarene monomer, or $S_1$ can be two or more monoblocks of the monovinylarene monomer, and optionally, initiator can be added before each monovinylarene monomer charge. Accordingly, $S_1$ can be produced by a process comprising any suitable number of monovinylarene monomer charges to result in 10 phm to 45 phm, for example, from 1 to 10 charges, from 1 to 6 charges, from 1 to 3 charges, 1 charge, from 2 to 8 charges, from 2 to 5 charges, from 2 to 3 charges, 2 charges, and the like. Thus, $S_1$ can be two monovinylarene blocks, such as in block structure $S_a$-$S_b$, or $S_1$ can be three monovinylarene monomer blocks, such as in block structure $S_a$-$S_b$-$S_c$, and so forth. Optionally, in the process of producing such block structures, initiator can be added before each monovinylarene monomer charge.

Likewise, $(S/B)_1$ in formula (1) can be a single mixed block of the conjugated diene monomer and the monovinylarene monomer, or $(S/B)_1$ can be two or more mixed blocks of the conjugated diene monomer and the monovinylarene monomer. Thus, $(S/B)_1$ can be two mixed blocks, such as in block structure $(S/B)_a$$(S/B)_b$, or $(S/B)_1$ can be three mixed blocks, such as in block structure $(S/B)_a$-$(S/B)_b$-$(S/B)_c$, and so forth. While not a requirement, often the monovinylarene monomer content, independently, in each mixed block (such as $(S/B)_a$, $(S/B)_b$, and $(S/B)_c$) can range from 20 wt. % to 80 wt. %, from about 25 wt. % to about 75 wt. %, or from about 40 wt. % to about 65 wt. %, based on the total weight of each mixed block. In some embodiments, at least one of these mixed blocks can be a tapered mixed block, while in others embodiments, at least one of these mixed blocks can be a random mixed block. Such mixed blocks can be produced by any suitable technique (e.g., pulsed monomer charges).

Block Copolymer Properties, Compositions, and Articles

The conjugated diene monovinylarene block copolymers produced by the methods and processes disclosed herein can have a variety of properties which make them suitable for various end-use applications. These block copolymers can have any of the polymer properties listed below and in any combination.

In some embodiments, the Shore A hardness of the block copolymer produced by the methods and processes disclosed herein typically can fall within a range from about 20 to about 95, from about 35 to about 95, or from about 45 to about 95. Other suitable and non-limiting ranges for the Shore A hardness include from about 35 to about 90, from about 45 to about 90, from about 50 to about 90, from about 60 to about 90, from about 40 to about 80, from about 50 to about 80, or from about 60 to about 80, and the like.

In some embodiments, the number-average molecular weight (Mn) of the block copolymer produced by the methods and processes disclosed herein can be in a range from about 5,000 to about 2,000,000 g/mol, from about 50,000 to about 2,000,000 g/mol, or from about 50,000 to about 1,000,000 g/mol. In other embodiments, the Mn can be in range from about 10,000 to about 700,000 g/mol, from about 20,000 to about 700,000 g/mol, from about 35,000 to about 700,000 g/mol, from about 25,000 to about 700,000 g/mol, from about 25,000 to about 500,000 g/mol, or from about 10,000 to about 500,000 g/mol.

Block copolymers produced in accordance with various embodiments of this invention generally can have a melt flow rate (MFR) of less than or equal to about 40 g/10 min. MFR is determined in accordance with ASTM D1238 at 200° C. with a 5 Kg load. Melt flow rates in the range from about 1 to about 30, from about 2 to about 25, from about 3 to about 20, from about 4 to about 20, or from about 5 to about 15 g/10 min, are contemplated in other embodiments of this invention. For example, the block copolymer can have a MFR in a range from about 3 to about 15, from about 4 to about 18, or from about 5 to about 25 g/10 min Block copolymers produced in accordance with various embodiments of this invention generally can have a pellet blocking force—equipment and test procedure are described herein—of less than or equal to about 200 $lb_f$, less than or equal to about 150 $lb_f$, less than or equal to about 120 $lb_f$, or less than or equal to about 110 $lb_f$. In further embodiments, the pellet blocking force can be less than or equal to about 100 $lb_f$, less than or equal to about 90 $lb_f$, less than or equal to about 75 $lb_f$, or less than or equal to about 60 $lb_f$. The lower limit of the blocking force is generally not determined (i.e., free flowing pellets).

Often, the block copolymers produced by the methods and processes disclosed herein can have a kink resistance of tubing produced from the copolymer of less than or equal to about 40 mm, tested in accordance with DIN EN 13868 as described herein. In one embodiment, the kink resistance can be less than or equal to about 35 mm, less than or equal to about 28 mm, or less than or equal to about 24 mm. Representative non-limiting ranges for the kink resistance include the following: from about 8 mm to about 40 mm, from about 8 to about 35 mm, from about 8 mm to about 30 mm, from about 8 to about 25 mm, from about 8 to about 22 mm, from about 9 to about 20 mm, from about 10 to about 40 mm, from about 10 mm to about 30 mm, from about 10 to about 25 mm, or from about 10 to about 20 mm, and the like.

Likewise, such block copolymers also can have a re-kink resistance of tubing produced from the copolymer of less than or equal to about 40 mm, less than or equal to about 35 mm, less than or equal to about 30 mm, or less than or equal to about 25 mm. Similarly, representative non-limiting ranges for the re-kink resistance include the following: from about 8 mm to about 40 mm, from about 8 to about 35 mm, from about 8 mm to about 30 mm, from about 8 to about 25 mm, from about 8 to about 22 mm, from about 10 to about 40 mm, from about 10 mm to about 30 mm, from about 10 to about 25 mm, or from about 10 to about 22 mm, and the like. The re-kink resistance is tested in accordance with DIN EN 13868 as described herein.

While not a requirement, the block copolymers described herein typically do not contain a plasticizer. Indeed, this can be an advantage over other polymers, such as PVC, which may require relatively large amounts of plasticizers to impart flexibility. However, if desired for a particular end-use, a plasticizer can be combined with the block copolymer at an appropriate loading.

The block copolymer can be modified with any suitable additive or additives, as recognized by those of skill in the art. For instance, the copolymer can be modified with one or more additives selected from an antioxidant, an acid scavenger, an antiblock additive, a slip additive (e.g., a fatty acid amide, erucamide), a colorant, a filler, a polymer processing aid (e.g., a fluoroelastomer), a UV absorber, a UV inhibitor, a lubricant (e.g., a wax, a mineral oil) and the like, as well as any combination thereof. In some embodiments, the copolymer can further comprise an antioxidant; alternatively, an acid scavenger; alternatively, an antiblock additive; alternatively, a slip additive; alternatively, a colorant; alternatively, a filler; alternatively, a polymer processing aid; alternatively, a UV absorber; alternatively, a UV inhibitor; or alternatively, a lubricant. These and other suitable additives and modifiers, which may be added to the copolymers in order to provide beneficial polymer processing or end-use product attributes, are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety.

Blends or combinations of the block copolymers and another polymer also are encompassed herein. For instance, the second polymer can be a different conjugated diene monovinylarene block copolymer, a styrenic polymer (e.g., a polystyrene, a high impact polystyrene, etc.), or a rubber (a polybutadiene, a polyisoprene, a poly-2-chloro-1,3-butadiene, a poly-1-chloro-1,3-butadiene, an ethylene/propylene terpolymer, a butadiene/acrylonitrile copolymer, a butyl rubber, an acrylic rubber, a styrene/isobutylene/butadiene copolymer, an isoprene/acrylic ester copolymer, etc.), as well as combinations thereof. Other polymer types can be used as blend components as well, such as polyolefins (LDPE, LLDPE, PP, etc.), ethylene/vinyl acetate, and so forth. Additionally, a composition containing the block copolymer of this invention and a second polymer also can contain one or more suitable additives or modifiers, such as those described hereinabove. Multilayer structures (e.g., coextrusions) and/or laminated structures (e.g., adhesive laminations) also can contain the block copolymer, whether as a single layer or in a blend, and with any additives or modifiers suitable for the end-use application of the multilayer or laminated structure.

The block copolymers, blends, multilayer and laminated structures, and so forth, can be formed into various articles of manufacture, and these articles of manufacture can have any thickness suitable for the desired end-use application. Articles which can comprise block copolymers, compositions, multilayer structures, etc., of this invention can include, but are not limited to, a film, a sheet, a bottle or container, a fiber or fabric, an adhesive or coating, a medical device or material, a pipe, or a flexible tube, and the like. Various processes can be employed to form these articles. Non-limiting examples of these processes include injection molding, blow molding, rotational molding, film extrusion, sheet extrusion, profile extrusion, thermoforming, and the like. Such processes and materials are described in *Modern Plastics Encyclopedia*, Mid-November 1995 Issue, Vol. 72, No. 12; and *Film Extrusion Manual—Process, Materials, Properties*, TAPPI Press, 1992. In some embodiments of this invention, an article of manufacture can comprise any of the block copolymers described herein (e.g., including blends, compositions, multilayer structures, etc.), can have any of the copolymer properties described herein, and the article of manufacture can be a tubing product, such as flexible tubing for medical applications.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Kink resistance testing was performed with an apparatus designed and built in accordance with DIN EN 13868: 2002-11 (Annex A, short term test method), and as described herein. The water line consisted of ⅜-inch (9.525-mm) OD (outside diameter) tubing with flow meters to measure water flow. The groove used to hold the tubing test specimen in place had a depth of 5.05 mm as measured. Tubing test specimens were 16 inches (406.4 mm) in length, and the test speed was kept low enough to avoid over pressurizing the tubing.

The tubing test specimens had an OD of ¼ inch (6.35 mm), represented by d in the equation below, and a nominal ID (inside diameter) of ⅛ inch (3.175 mm) In reference to the testing diagram in FIG. 1, the plate distance was measured as D in mm, and the reported kink resistance (C in the equation below, mm) was calculated according to the following equation:

$$C = D + 2h - d(\sqrt{2} - 1) = D + 7.5 \text{ } (mm),$$

where D is the measured plate distance at half of the original water flow rate (decrease in flow rate such the initial flow rate through the straight tubing is reduced by 50%), h is the measured groove depth (5.05 mm), and d is the tubing OD (6.35 mm) A manual press capable of providing a force up to 50 $lb_f$ was used to close the gap between plates during testing.

The water temperature was set to ambient conditions of about 25° C. The rate at which force was applied by the press was manually adjusted to prevent sudden kinking of the tubing during the test (i.e., to prevent the water flow rate from decreasing to zero before the kink resistance could be measured).

Re-kink resistance was measured under the same conditions as those described for kink resistance testing. After the initial kink test was performed, the re-kink resistance was measured by opening the plate distance and repeating the procedure to measure the point at which the water flow rate decreased to half of the flow rate observed at the start of the re-kink test. Typically, the re-kink measurement (C in the equation provided above) was higher than the kink measurement due to the weak spot that formed in the tubing during the original kink measurement.

Tubing specimens for kink resistance testing and re-kink resistance testing were produced using single screw extrusion. The extruder was a Vented Extruder Model 2523, ¾", L/D 25:1 Ratio, from C.W. Brabender® Instruments Inc. The tubing die was an interchangeable die head with 0.25 inch (6.35 mm) OD and 0.125 inch (3.175 mm) ID mandrel tip combinations. The typical temperature profile ranges used for tubing extrusion are provided in Table I below.

TABLE I

Extrusion Conditions.

| | Range | Range |
|---|---|---|
| Rear (feed) | 280°-365° F. | (138°-185° C.) |
| Middle (transition) | 320°-390° F. | (160°-199° C.) |
| Front (near die end) | 320°-390° F. | (160°-199° C.) |
| Die | 280°-365° F. | (138°-185° C.) |
| Extruder speed | 40-100 RPM | |
| Puller Speed | 15-40 RPM | |

Shore A hardness testing was performed according to ASTM D2240-05 with a 30 second delay. The Shore A hardness test was performed at ambient conditions on a compression molded 2 inch×2 inch (50.8 mm×50.8 mm) square specimen with ½ inch (12.7 mm) thickness.

Melt Flow Rate (MFR) was measured according to modified ASTM D1238-13 using the standard polystyrene conditions (load of 5 kg and temperature of 200° C.) with a holding time of 300 seconds.

Pellet blocking force was measured as the shear force required to break a cylindrically-shaped pellet aggregate. To form the pellet aggregate, about 300 grams of pellets were placed in a 3 inch (76.2 mm) ID rigid pipe, a 2.5 kg weight was placed on top of the pellets, and the cylinder and its contents were placed in a forced air oven maintained at 65° C. for 90 hours. After cooling to room temperature, the weight and cylinder were removed, then the pellet aggregate was placed in a shearing fixture in an Instron® load frame, and tested in shear. The pellet blocking force (anti-blocking property) of the sample was the pound force ($lb_f$) required to shear the pellet aggregate.

Examples 1-5

The materials and polymerization processes for Examples 1-5 are as described below. Cyclohexane was dried over activated alumina and stored under nitrogen. n-Butyl lithium initiator (abbreviated BuLi) was used as received at 2 wt. % in cyclohexane. THF was stored over activated alumina under nitrogen. Styrene (S) and butadiene (B) were purified over activated alumina Epoxidized soybean oil was a 20% solution in $C_6$ purged with and stored under $N_2$.

The polymerizations were performed in a 2-gallon stainless steel reactor using sequential solution polymerization under nitrogen. The reactor was equipped with a jacket for temperature control, a double auger impeller, and baffles. Generally, each block was formed by polymerizing the monomer or mixture of monomers from which the desired units of the block are derived.

Cyclohexane was initially charged to the reactor, followed by a solution of the THF or KTA modifier (if used) in cyclohexane. The temperature was adjusted to about 60° C., and the BuLi initiator was charged, followed by the first charge of styrene monomer (Styrene 1). This was followed by a second charge of BuLi and a second charge of styrene monomer (Styrene 2). The next three charges were mixed blocks of butadiene and styrene (B1+S3, B2+S4, B3+S5) at specified weight percentages of the butadiene (Bd %). Feed lines to the reactor were flushed with about 0.1 kg cyclohexane following each charge. Polymerization was allowed to continue to completion after each monomer or monomer mixture charge. The polymerization temperature ranged from about 38° C. to about 120° C., and pressure ranged from about 2 psig to about 180 psig. Following completion of the sequential polymerizations, a coupling agent (CA, epoxidized soybean oil) was charged to the reactor and allowed to react at about 100° C. for about 10 min. After coupling, the reaction was terminated by adding $CO_2$ and about 0.2 phm water.

Table II summarizes certain production parameters (e.g., charge sequence, composition of each charge) and properties of Examples 1-5. The conditions used to produce the styrene butadiene block copolymers (64% styrene) of Examples 1-5 were held constant, with the exception of the modifier addition and amount. Tubing specimens of Examples 1-5 were produced from the SBC block copolymers via the extrusion system and conditions described above (see Table I).

As shown in Table II, the addition of the modifier unexpectedly decreased the Shore A hardness. In Examples 1-4, the Shore A hardness decreased from 93 to 52 as the added amount of the modifier increased. Furthermore, and quite surprisingly, the addition of the modifier also increased the pellet blocking force.

TABLE II

Examples 1-5.

| Example | 1 | 2 | 3 | 4 | 5 |
|---|---|---|---|---|---|
| Modifier | N/A | THF | THF | THF | KTA |
| Modifier, phm | 0 | 0.03 | 0.09 | 0.27 | 0.06 |
| BuLi, phm | 0.065 | 0.065 | 0.065 | 0.065 | 0.065 |
| Styrene 1, phm | 15 | 15 | 15 | 15 | 15 |
| BuLi, phm | 0.06 | 0.06 | 0.06 | 0.06 | 0.06 |
| Styrene 2, phm | 16 | 16 | 16 | 16 | 16 |
| B1 + S3, phm | 23 | 23 | 23 | 23 | 23 |
| Bd % in (B1/S3) | 52% | 52% | 52% | 52% | 52% |
| B2 + S4, phm | 23 | 23 | 23 | 23 | 23 |
| Bd % in (B2/S4) | 52% | 52% | 52% | 52% | 52% |
| B3 + S5, phm | 23 | 23 | 23 | 23 | 23 |
| Bd % in (B3/S5) | 52% | 52% | 52% | 52% | 52% |
| CA, phm | 0.4 | 0.4 | 0.4 | 0.4 | 0.4 |
| Total Styrene, phm | 64 | 64 | 64 | 64 | 64 |
| Kink Resistance (mm) | 20 | 21 | 27 | — | 20 |
| Re-Kink Resistance (mm) | 21 | 23 | 28 | — | 21 |
| Shore A Hardness | 93 | 72 | 60 | 52 | 47 |
| MFR (g/10 min) | 11.9 | 14.3 | 10.4 | 9.6 | 4.5 |
| Pellet Blocking ($lb_f$) | 70 | 165 | 184 | 210 | 163 |

Examples 6-9

Examples 6-9 were performed in the same manner as that of Examples 1-5. Table III summarizes certain production parameters (e.g., charge sequence, composition of each charge) and properties of Examples 6-9. As compared to Examples 1-5, the charge sequence used in Examples 6-9 had higher initial styrene charges (Styrene 1 and Styrene 2) and different styrene/butadiene dual charges (B1+S3, B2+S4, B3+S5). The conditions used to produce the styrene butadiene block copolymers (62% styrene) of Examples 6-9 were held constant, with the exception of the modifier addition and amount. Tubing specimens of Examples 6-9 were produced from the SBC block copolymers via the extrusion system and conditions described above (see Table I).

Unexpectedly, as summarized in Table III, the addition of the modifier decreased the Shore A hardness and increased the pellet blocking force.

TABLE III

| Examples 6-9. | | | | |
|---|---|---|---|---|
| Example | 6 | 7 | 8 | 9 |
| Modifier | N/A | THF | THF | KTA |
| Modifier, phm | 0 | 0.03 | 0.09 | 0.06 |
| BuLi, phm | 0.067 | 0.067 | 0.067 | 0.067 |
| Styrene 1, phm | 17 | 17 | 17 | 17 |
| BuLi, phm | 0.06 | 0.06 | 0.06 | 0.06 |
| Styrene 2, phm | 16 | 16 | 16 | 16 |
| B1 + S3, phm | 26 | 26 | 26 | 26 |
| Bd % in (B1/S3) | 54% | 54% | 54% | 54% |
| B2 + S4, phm | 24 | 24 | 24 | 24 |
| Bd % in (B2/S4) | 46% | 46% | 46% | 46% |
| B3 + S5, phm | 17 | 17 | 17 | 17 |
| Bd % in (B3/S5) | 76% | 76% | 76% | 76% |
| CA, phm | 0.4 | 0.4 | 0.4 | 0.4 |
| Total Styrene, phm | 62 | 62 | 62 | 62 |
| Kink Resistance (mm) | 27 | 17 | 17 | 20 |
| Re-Kink Resistance (mm) | 31 | 19 | 18 | 20 |
| Shore A Hardness | 73 | 73 | 67 | 70 |
| MFR (g/10 min) | 4.8 | 8.6 | 15.8 | 2.1 |
| Pellet Blocking (lb$_f$) | 54 | 66 | 146 | 145 |

Examples 10-13

Examples 10-13 were performed in the same manner as that of Examples 1-5. Table IV summarizes certain production parameters (e.g., charge sequence, composition of each charge) and properties of Examples 10-13. As compared to Examples 6-9, the charge sequence used in Examples 10-13 had lower initial styrene charges (Styrene 1 and Styrene 2) and different styrene/butadiene dual charges (B1+S3, B2+S4, B3+S5), but the same overall styrene content. The conditions used to produce the styrene butadiene block copolymers (62% styrene) of Examples 10-13 were held constant, with the exception of the modifier addition and amount. Tubing specimens of Examples 10-13 were produced from the SBC block copolymers via the extrusion system and conditions described above (see Table I).

Similar to the results for Examples 1-5 and Examples 6-9, Table IV demonstrates that the addition of the modifier unexpectedly decreased the Shore A hardness and increased the pellet blocking force. Also of interest, for Examples 1-13, there did not appear to be a consistent correlation between the addition of the modifier and the MFR of the copolymer, nor between the addition of the modifier and the kink resistance (or re-kink resistance).

TABLE IV

| Examples 10-13. | | | | |
|---|---|---|---|---|
| Example | 10 | 11 | 12 | 13 |
| Modifier | N/A | THF | THF | KTA |
| Modifier, phm | 0 | 0.03 | 0.09 | 0.06 |
| BuLi, phm | 0.065 | 0.065 | 0.065 | 0.065 |
| Styrene 1, phm | 15 | 15 | 15 | 15 |
| BuLi, phm | 0.065 | 0.065 | 0.065 | 0.065 |
| Styrene 2, phm | 14 | 14 | 14 | 14 |
| B1 + S3, phm | 28 | 28 | 28 | 28 |
| Bd % in (B1/S3) | 50% | 50% | 50% | 50% |
| B2 + S4, phm | 26 | 26 | 26 | 26 |
| Bd % in (B2/S4) | 42% | 42% | 42% | 42% |
| B3 + S5, phm | 17 | 17 | 17 | 17 |
| Bd % in (B3/S5) | 76% | 76% | 76% | 76% |
| CA, phm | 0.4 | 0.4 | 0.4 | 0.4 |
| Total Styrene, phm | 62 | 62 | 62 | 62 |
| Kink Resistance (mm) | 13 | 17 | 14 | 19 |
| Re-Kink Resistance (mm) | 17 | 18 | 15 | 21 |
| Shore A Hardness | 78 | 67 | 64 | 56 |
| MFR (g/10 min) | 13.7 | 11.3 | 16.4 | 9.5 |
| Pellet Blocking (lb$_f$) | 81 | 123 | 174 | 153 |

The invention is described above with reference to numerous aspects and embodiments, and specific examples. Many variations will suggest themselves to those skilled in the art in light of the above detailed description. All such obvious variations are within the full intended scope of the appended claims. Other embodiments of the invention can include, but are not limited to, the following (embodiments are described as "comprising" but, alternatively, can "consist essentially of" or "consist of"):

Embodiment 1

A method of controlling a conjugated diene monovinylarene copolymerization reaction, the method comprising:

(i) contacting a monovinylarene monomer, a conjugated diene monomer, and an initiator in a predetermined sequence under polymerization conditions in a polymerization reactor system, and thereafter coupling and/or terminating to form a conjugated diene monovinylarene block copolymer;

wherein the predetermined sequence comprises a dual charge of the monovinylarene monomer and the conjugated diene monomer; and (ii) introducing a modifier into the polymerization reactor system before the dual charge to control hardness of the copolymer.

Embodiment 2

A process for producing a conjugated diene monovinylarene block copolymer with a target hardness, the process comprising:

(a) contacting a monovinylarene monomer, a conjugated diene monomer, and an initiator in a predetermined sequence under polymerization conditions in a polymerization reactor system, and thereafter coupling and/or terminating to form the copolymer;

wherein the predetermined sequence comprises a dual charge of the monovinylarene monomer and the conjugated diene monomer; and (b) controlling an amount of a modifier introduced into the polymerization reactor system to produce the copolymer with the target hardness.

Embodiment 3

The method or process defined in embodiment 1 or 2, wherein the modifier comprises any suitable modifier or any modifier disclosed herein, e.g., amines (TEA), metal phenolates, metal sulfonate (NaDBS), bidentates (diglyme, TMEDA), tri-dentates, ethers and cycloethers (THF), alkali metal alkoxides (KTA, NaODMO), etc., as well as any combination thereof Embodiment 4

The method or process defined in any one of embodiments 1-3, wherein the modifier comprises THF.

Embodiment 5

The method or process defined in any one of embodiments 1-3, wherein the modifier comprises KTA.

Embodiment 6

The method or process defined in any one of embodiments 1-5, wherein the amount of the modifier introduced into the polymerization reactor system is in any suitable range or any range of molar ratios disclosed herein, based on the total moles of modifier to the total moles of monomer, e.g., from about 1:250 to about 1:10,000, from about 1:500 to about 1:5,000, from about 1:1,000 to about 1:5,000, from about 1:1,500 to about 1:5,000, from about to about 1:1,500 to about 1:3,000, etc.

Embodiment 7

The method or process defined in any one of embodiments 1-6, wherein the polymerization reactor system comprises a stirred tank reactor.

Embodiment 8

The method or process defined in any one of embodiments 1-7, wherein the monovinylarene monomer contains from 8 to 18 carbon atoms.

Embodiment 9

The method or process defined in any one of embodiments 1-8, wherein the monovinylarene monomer is styrene.

Embodiment 10

The method or process defined in any one of embodiments 1-9, wherein the conjugated diene monomer contains from 4 to 12 carbon atoms.

Embodiment 11

The method or process defined in any one of embodiments 1-10, wherein the conjugated diene monomer is a butadiene.

Embodiment 12

The method or process defined in any one of embodiments 1-11, wherein the conjugated diene monomer is 1,3-butadiene.

Embodiment 13

The method or process defined in any one of embodiments 1-12, wherein the conjugated diene monovinylarene block copolymer is a styrene butadiene block copolymer.

Embodiment 14

The method or process defined in any one of embodiments 1-13, wherein the copolymer has a Mn, in step (ii) and/or step (b), in any range disclosed herein, e.g., from about 5,000 to about 2,000,000 g/mol, from about 10,000 to about 500,000 g/mol, etc.

Embodiment 15

The method or process defined in any one of embodiments 1-14, wherein the copolymer has a melt flow rate (MFR), in step (ii) and/or step (b), in any range disclosed herein, e.g., from about 1 to about 30 g/10 min, from about 3 to about 20 g/10 min, etc.

Embodiment 16

The method or process defined in any one of embodiments 1-15, wherein the copolymer has a Shore A hardness, in step (ii) and/or step (b), in any range disclosed herein, e.g., from about 20 to about 95, from about 35 to about 90, from about 50 to about 90, from about 60 to about 80, etc.

Embodiment 17

The method or process defined in any one of embodiments 1-16, wherein the copolymer has a pellet blocking force, in step (ii) and/or step (b), in any range disclosed herein, e.g., less than or equal to about 150 $lb_f$, less than or equal to about 120 $lb_f$, less than or equal to about 100 $lb_f$, less than or equal to about 60 $lb_f$, etc.

Embodiment 18

The method or process defined in any one of embodiments 1-17, wherein the polymerization conditions comprise a polymerization reaction temperature in a range from about −100° C. to about 150° C. (or from about 10° C. to about 125° C.) and a reaction pressure in a range from about 14.8 to about 180 psig (or from about 0.1 to about 1.2 MPa).

Embodiment 19

The method or process defined in any one of embodiments 1-18, wherein the polymerization conditions are substantially constant, for example, for a particular copolymer grade.

Embodiment 20

The method or process defined in any one of embodiments 1-19, further comprising the steps of determining (or measuring) the hardness (e.g., Shore A hardness), and adjusting the amount of the modifier introduced into the polymerization reactor system based on the difference between the measured hardness and the target hardness.

Embodiment 21

The method or process defined in any one of embodiments 1-20, wherein introducing the modifier into the polymerization reactor system decreases the hardness (e.g., Shore A hardness) of the copolymer.

Embodiment 22

The method or process defined in any one of embodiments 1-21, wherein introducing the modifier into the polymerization reactor system increases the pellet blocking force of the copolymer.

Embodiment 23

The method or process defined in any one of embodiments 1-22, wherein the modifier is introduced into the polymerization reactor system continuously.

Embodiment 24

The method or process defined in any one of embodiments 1-22, wherein the modifier is introduced into the polymerization reactor system periodically.

Embodiment 25

The method or process defined in any one of embodiments 1-22, wherein the modifier is introduced before a first dual charge.

Embodiment 26

The method or process defined in any one of embodiments 1-22, wherein the modifier is introduced before each dual charge.

Embodiment 27

The method or process defined in any one of embodiments 1-26, wherein the predetermined sequence comprises two or more dual charges.

Embodiment 28

The method or process defined in any one of embodiments 1-25, wherein the predetermined sequence comprises only one dual charge.

Embodiment 29

The method or process defined in any one of embodiments 1-28, wherein the conjugated diene monovinylarene block copolymer contains any amount of the monovinylarene monomer disclosed herein, e.g., from about 15 to about 95 wt. %, from about 50 to about 80 wt. %, from about 55 to about 85 wt. %, from about 65 to about 80 wt. %, etc., monovinylarene monomer content, based on the total weight of the block copolymer.

Embodiment 30

The method or process defined in any one of embodiments 1-29, wherein the conjugated diene monovinylarene block copolymer contains any number of blocks disclosed herein, e.g., from 3 to 10 blocks, from 4 to 7 blocks, etc.

Embodiment 31

The method or process defined in any one of embodiments 1-30, wherein the conjugated diene monovinylarene block copolymer comprises from about 35 phm to about 80 phm monovinylarene monomer, and comprises polymer chains containing a block structure having formula (1):

$$S_1-(S/B)_1 \quad (1);$$

wherein:

$S_1$ is a monoblock of the monovinylarene monomer, wherein $S_1$ is from about 10 phm to about 45 phm of the copolymer; and $(S/B)_1$ is a mixed block of the conjugated diene monomer and the monovinylarene monomer, wherein the monovinylarene monomer content is from 20 wt. % to 80 wt. %, based on the total weight of $(S/B)_1$.

Embodiment 32

The method or process defined in embodiment 31, wherein $S_1$ in formula (1) comprises one monoblock or two monoblocks of the monovinylarene monomer.

Embodiment 33

The method or process defined in embodiment 31 or 32, wherein $(S/B)_1$ in formula (1) comprises from two to four mixed blocks.

The invention claimed is:

1. A method of controlling a conjugated diene monovinylarene copolymerization reaction, the method comprising:
   (i) contacting a monovinylarene monomer, a conjugated diene monomer, and an initiator in a predetermined sequence under polymerization conditions in a polymerization reactor system, and thereafter coupling and/or terminating to form a conjugated diene monovinylarene block copolymer;
   wherein the predetermined sequence comprises a dual charge of the monovinylarene monomer and the conjugated diene monomer; and
   (ii) introducing a modifier into the polymerization reactor system before the dual charge to control a Shore A hardness of the copolymer, wherein the Shore A hardness of the copolymer decreases as an amount of the modifier introduced into the polymerization reactor system increases, and wherein the Shore A hardness of the copolymer is in a range from about 20 to about 95.

2. The method of claim 1, wherein the modifier comprises an amine, a metal phenolate, a metal sulfonate, an ether, an alkali metal alkoxide, or a combination thereof.

3. The method of claim 1, wherein the modifier comprises tetrahydrofuran (THF).

4. The method of claim 1, wherein the modifier comprises potassium tert-amylate (KTA).

5. The method of claim 1, wherein an amount of the modifier introduced into the polymerization reactor system is in a range from about 1:250 to about 1:10,000, based on the total moles of the modifier to the total moles of the monovinylarene monomer and the conjugated diene monomer.

6. The method of claim 1, wherein:
   the monovinylarene monomer is styrene; and
   the conjugated diene monomer is a butadiene.

7. The method of claim 6, wherein a kink resistance of tubing produced from the copolymer of step (ii) and tested in accordance with DIN EN 13868 is in a range from about 10 to about 32 mm.

8. The method of claim 1, wherein:
   the conjugated diene monovinylarene block copolymer is a styrene butadiene block copolymer;
   a Shore A hardness of the copolymer is in a range from about 20 to about 95; and
   an amount of the modifier introduced into the polymerization reactor system is in a range from about 1:500 to about 1:5,000, based on the total moles of the modifier to the total moles of the monovinylarene monomer and the conjugated diene monomer.

9. The method of claim 8, wherein:
   a pellet blocking force of the copolymer increases as the amount of the modifier introduced into the polymerization reactor system increases;

the copolymer has from about 55 to about 85 wt. % monovinylarene monomer content, based on the total weight of the copolymer; and the conjugated diene monovinylarene block copolymer contains from 3 to 8 blocks.

10. The method of claim 1, further comprising measuring the Shore A hardness, and adjusting an amount of the modifier introduced into the polymerization reactor system based on a difference between the measured Shore A hardness and a target Shore A hardness.

11. The method of claim 1, wherein the predetermined sequence comprises two or more dual charges, and the modifier is introduced into the polymerization reactor system before each dual charge.

12. The method of claim 1, wherein the block copolymer comprises from about 35 phm to about 80 phm monovinylarene monomer, and comprises polymer chains containing a block structure having formula (1):

$$S_1\text{-}(SB)_1 \quad (1);$$

wherein:

S$_1$ is a monoblock of the monovinylarene monomer, wherein S$_1$ is from about 10 phm to about 45 phm of the copolymer; and (SB)$_1$ is a mixed block of the conjugated diene monomer and the monovinylarene monomer, wherein the monovinylarene monomer content is from 20 wt. % to 80 wt. %, based on the total weight of (SB)$_1$.

13. A process for producing a conjugated diene monovinylarene block copolymer with a target Shore A hardness, the process comprising:

(a) contacting a monovinylarene monomer, a conjugated diene monomer, and an initiator in a predetermined sequence under polymerization conditions in a polymerization reactor system, and thereafter coupling and/or terminating to form the copolymer;

wherein the predetermined sequence comprises a dual charge of the monovinylarene monomer and the conjugated diene monomer; and (b) controlling an amount of a modifier introduced into the polymerization reactor system to produce the copolymer with the target Shore A hardness; wherein the target Shore A hardness is in a range from about 20 to about 95.

14. The process of claim 13, wherein:

the Shore A hardness of the copolymer decreases as the amount of the modifier introduced into the polymerization reactor system increases; and a target Shore A hardness is in a range from about 20 to about 95.

15. The process of claim 13, wherein the copolymer is a styrene butadiene block copolymer.

16. The process of claim 15, wherein the copolymer has a Mn in a range from about 10,000 to about 500,000 g/mol and a MFR in a range from about 1 to about 30 g/10 min; and a target Shore A hardness is in a range from about 35 to about 90.

17. The process of claim 16, wherein the copolymer has from about 55 to about 85 wt. % monovinylarene monomer content, based on the total weight of the copolymer.

18. The process of claim 13, wherein:

the monovinylarene monomer is styrene;

the conjugated diene monomer is a butadiene; and a target Shore A hardness is in a range from about 40 to about 95.

19. The process of claim 18, wherein:

the copolymer has from about 50 to about 95 wt. % monovinylarene monomer content, based on the total weight of the copolymer; and a pellet blocking force of the copolymer decreases as the amount of the modifier introduced into the polymerization reactor system decreases.

20. The method of claim 1, wherein a Shore A hardness of the copolymer is in a range from about 35 to about 90.

* * * * *

UNITED STATES PATENT AND TRADEMARK OFFICE
CERTIFICATE OF CORRECTION

PATENT NO. : 9,441,090 B1
APPLICATION NO. : 14/645841
DATED : September 13, 2016
INVENTOR(S) : Jinping Joe Zhou Page 1 of 1

It is certified that error appears in the above-identified patent and that said Letters Patent is hereby corrected as shown below:

In the Claims

Column 24, Lines 57-58 Claim 8: "a Shore A hardness of the copolymer is in a range from about 20 to about 95;" should be deleted Column 26, Lines 9-11 Claim 14: "; and a target Shore A hardness is in a range from about 20 to about 95" should be deleted Column 26, Line 18 Claim 16: "a target" should be replaced with --the target--

Column 26, Line 26 Claim 18: "a target" should be replaced with --the target--

Column 26, Line 36 Claim 20: "a Shore" should be replaced with --the Shore--

Signed and Sealed this
Thirtieth Day of May, 2017

Michelle K. Lee
*Director of the United States Patent and Trademark Office*